(12) United States Patent
Burtchen et al.

(10) Patent No.: US 10,115,516 B2
(45) Date of Patent: Oct. 30, 2018

(54) PLANAR INDUCTOR

(71) Applicant: THYSSENKRUPP ROTHE ERDE GMBH, Dortmund (DE)

(72) Inventors: Marco Burtchen, Lippstadt (DE); Mathieu Raymond Karl Langels, Erwitte (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 12 days.

(21) Appl. No.: 14/765,249

(22) PCT Filed: Jan. 28, 2014

(86) PCT No.: PCT/EP2014/051658
§ 371 (c)(1),
(2) Date: Jul. 31, 2015

(87) PCT Pub. No.: WO2014/118196
PCT Pub. Date: Aug. 7, 2014

(65) Prior Publication Data
US 2015/0364247 A1    Dec. 17, 2015

(30) Foreign Application Priority Data
Feb. 1, 2013 (DE) .................. 10 2013 101 057

(51) Int. Cl.
*H01F 27/30* (2006.01)
*H01F 27/28* (2006.01)
(Continued)

(52) U.S. Cl.
CPC .......... *H01F 27/2823* (2013.01); *C21D 1/10* (2013.01); *C21D 1/42* (2013.01); *H01F 41/04* (2013.01);
(Continued)

(58) Field of Classification Search
CPC ....... H01F 27/2823; H01F 41/04; C21D 1/10; C21D 1/42
(Continued)

(56) References Cited

U.S. PATENT DOCUMENTS 3,716,690 A    2/1973   Bryant
5,111,169 A *  5/1992   Ikeda ............... H03H 7/427
                                           333/181
(Continued)

FOREIGN PATENT DOCUMENTS

CN    87206803 U    5/1988
CN    102598168 A   7/2012
(Continued)

OTHER PUBLICATIONS

German language International Search Report for International patent application No. PCT/EP2014/051658; dated May 8, 2014.
(Continued)

*Primary Examiner* — Elvin G Enad
*Assistant Examiner* — Kazi Hossain
(74) *Attorney, Agent, or Firm* — thyssenkrupp North America, Inc.

(57) ABSTRACT

The present invention relates to a planar inductor for progressive case hardening, comprising a carrier and an induction coil, which is accommodated by the carrier and exposed on a first side of the carrier and which is in the form of a conductor loop. According to the invention, the inductor comprises two spacing elements, which are space apart from one another and inserted into the carrier and which protrude from the carrier and beyond the conductor loop on the first side. The invention further relates to a preferred method for producing the planar inductor.

19 Claims, 3 Drawing Sheets

(51) Int. Cl.
*C21D 1/10* (2006.01)
*C21D 1/42* (2006.01)
*H01F 41/04* (2006.01)

(52) U.S. Cl.
CPC ........ *C21D 2221/00* (2013.01); *Y02P 10/253* (2015.11); *Y10T 29/49073* (2015.01)

(58) Field of Classification Search
USPC ................................ 336/199, 200, 232, 192
See application file for complete search history.

(56) References Cited

U.S. PATENT DOCUMENTS

| | | | | |
|---|---|---|---|---|
| 2005/0110606 | A1* | 5/2005 | Vinciarelli | H01F 27/2804 336/200 |
| 2008/0141535 | A1 | 6/2008 | Rollmann et al. | |
| 2008/0159062 | A1* | 7/2008 | Kaufmann | B01F 11/0014 366/110 |
| 2010/0259353 | A1* | 10/2010 | Saito | H01F 27/292 336/205 |
| 2012/0098631 | A1* | 4/2012 | Ono | H01F 3/14 336/96 |
| 2012/0133469 | A1* | 5/2012 | Tomonari | H01F 27/292 336/192 |
| 2013/0015719 | A1* | 1/2013 | Jung | H04B 5/0037 307/104 |
| 2014/0340940 | A1* | 11/2014 | Ouyang | H01F 30/06 363/17 |

FOREIGN PATENT DOCUMENTS

| | | |
|---|---|---|
| DE | 841180 C | 6/1952 |
| DE | 972404 C | 7/1959 |
| DE | 3521401 A | 12/1986 |
| DE | 102005006701 B3 | 3/2006 |
| DE | 102008033735 A1 | 2/2010 |
| JP | 2002057045 * | 2/2002 |
| WO | 2010/006689 A1 | 1/2010 |

OTHER PUBLICATIONS

English translation of International Search Report for International patent application No. PCT/EP2014/051658; dated May 8, 2014.
Hao Yu Liu, Electrical and Electronical Technology for a Motor Vehicle, Higher Education Press, p. 21, Jan. 31, 2005. [No English Translation available. Cited in Chinese OA dated Apr. 5, 2016, under corresponding app. CN201480006692.9.].
Evanoff, Manufacturing Technology for Electrotechnical Instrument, Mechanical Industry Press, pp. 254-255, Apr. 30, 1966. [No English Translation available. Cited in Chinese OA dated Apr. 5, 2016, under corresponding app. CN201480006692.9.].
Xi An, Industrial Heating (serial No. 2), Electric Furnace Research Institute Research Team of Welding Line Heating Treatment for Silicon Steel Belt, Planar Induction Heater and Use Thereof, pp. 1-3, Dec. 31, 1974. [No English Translation available. Cited in Chinese OA dated Apr. 5, 2016, under corresponding app. CN201480006692.9.].
Chinese Office Action issued in corresponding app. CN201480006692. 9, dated Apr. 5, 2016.

* cited by examiner

PLANAR INDUCTOR

CROSS REFERENCE TO RELATED APPLICATIONS

This application is a U.S. National Stage Entry of International Patent Application Serial Number PCT/EP2014/051658, filed Jan. 28, 2014, which claims priority to German patent application no. DE 102013101057.1 filed Feb. 1, 2013, the entire contents of both of which are incorporated herein by reference.

FIELD

The invention relates to a planar inductor for progressive surface layer hardening, with a carrier and an induction coil, which is accommodated by the carrier, is exposed on a first side of the carrier and is in the form of a conductor loop.

BACKGROUND

Planar inductors may be guided, in an advancing operation, over a surface to be hardened of a metallic workpiece. The conductor loop is located here in a plane which is parallel to the surface to be hardened, wherein a predetermined spacing gap remains between the conductor loop as the induction coil and the surface. In order to permit as efficient heating up by means of induction as possible, a small spacing gap within the millimeter range or submillimeter range is generally set. On the other hand, however, direct contact between the induction coil and the workpiece to be hardened also has to be avoided in order to avoid local overheating and adhesion of material due to melting.

The planar inductor can be used in particular in the case of a large rolling bearing for hardening a running surface. Corresponding methods are known from DE 10 2005 006 701 B3 and DE 10 2008 033 735 A1.

The inductors which are merely illustrated schematically in the documents mentioned have a conductor loop with two parallel limbs The limbs here are oriented perpendicularly to the direction of movement of the inductor during the progressive surface layer hardening and can be arranged on a carrier composed of a flux concentration material. With the inductor, the surface arranged therebelow is heated to a temperature which causes a structural conversion of the surface layer, with the hot surface subsequently being quenched in the advancing operation, for which purpose, for example, a cooling liquid is applied with a sprinkler.

In order, during the surface layer hardening in the advancing operation, to be able to maintain a predetermined distance between the planar, customarily flat inductor and the surface to be hardened, the inductor is customarily arranged so as to be adjustable by means of an adjustment mechanism or in a floating manner, wherein measurement of the distance takes place with a measuring roller arranged next to the inductor. The use of a measuring roller has proven successful in practice. If, however, as per a method according to DE 10 2005 006 701 B1, two inductors are moved in an opposed direction on an annular surface, said inductors have to be brought up to each other as close as possible at the beginning and at the end of the surface layer hardening, and therefore the use of a laterally arranged roller is then not readily possible. Furthermore, the roller does not serve for the direct force resistance, but merely for measuring the distance, with the gap size then being tracked by a suitable adjustment. The known system cannot keep the gap constant under all circumstances at the beginning of the hardening operation because considerable attraction forces can result precisely by switching on the currents at the beginning, said attraction forces drawing the inductor onto the surface to be hardened, in which case damage is then not ruled out.

In order to avoid such contact during the hardening of large rolling bearings, it is known to guide a plastics strip made from polytetrafluoroethylene between the inductor and the surface to be hardened immediately on switching on the currents. The plastics strip then serves as a spacer and avoids the inductor striking directly against the metallic surface to be hardened. With the reaching of a constant alternating current, the attraction forces then decrease, and therefore the plastics strip can be removed by a user. If the plastics strip remains too long between the inductor and the surface to be hardened, there is the risk of the plastics strip melting or disintegrating, as a result of which soiling may occur.

SUMMARY

The present invention is based on the object of specifying a planar inductor for progressive surface layer hardening, with which the operational reliability can be improved.

BRIEF DESCRIPTION OF THE DRAWINGS

The present disclosure is described in detail below with reference to the attached drawing figures, wherein.

DETAILED DESCRIPTION

Figure 1:
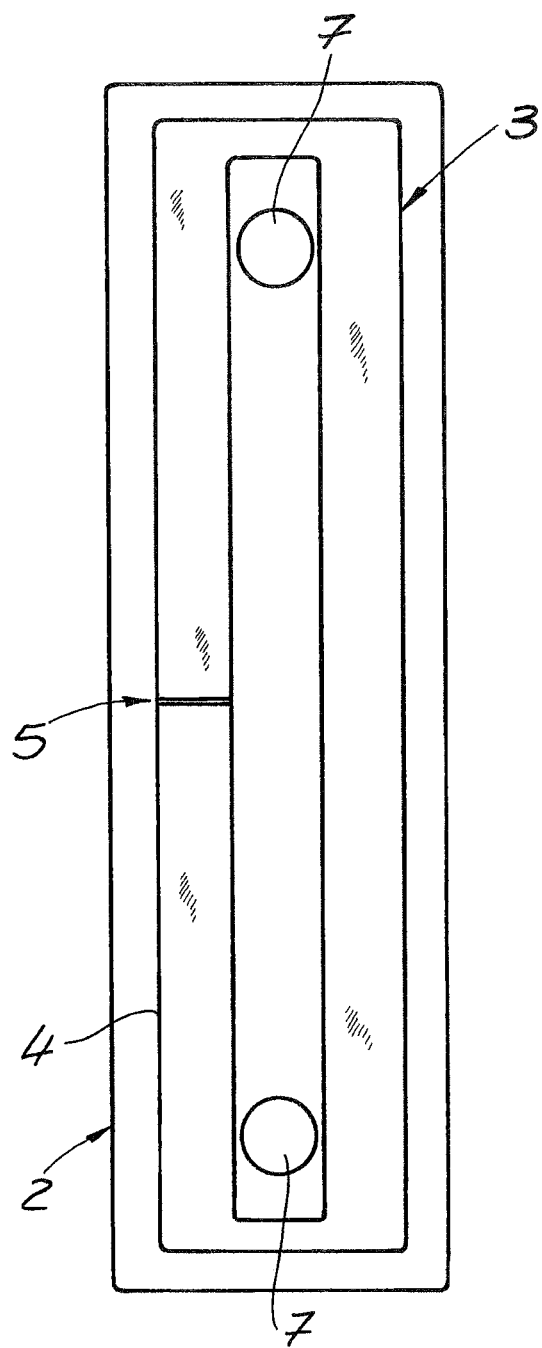
FIG. 1 is a side view of an embodiment of a planar inductor of the present disclosure.

The invention relates to, and the object is achieved by, a planar inductor as claimed in patent claim 1. Starting from a planar inductor of the type in question, two spacing elements which are arranged at a distance from each other, are inserted into the carrier and protrude from the carrier on the first side and over the conductor loop are provided according to the invention. The spacing elements which are spaced apart from each other are provided as safety devices in order to avoid direct contact between the conductor loop and the surface to be hardened. A uniform support is achieved by the use of two spacing elements which are spaced apart from each other. In particular, a substantially punctiform support can be achieved in each case by the two spaced-apart spacing elements, and therefore the further function of the inductor is not impaired.

It is not ruled out within the context of the invention that the inductor is equipped overall with more than two spacing elements. However, a configuration which has precisely two spacing elements spaced apart from each other is preferred.

The planar inductor is customarily flat or substantially flat. In a corresponding manner, the first side of the carrier is also located in a plane, wherein the induction coil is customarily inserted into the plane either flush with the surface thereof or protrudes slightly from the plane. Furthermore, the inductor preferably has a rectangular shape with a long side and a short side. The length ratio of the long side to the short side can be, in particular, 2:1 or more. Configurations with a length ratio of between 4:1 and 5:1 are particularly preferred.

The two spacing elements are located as far away from each other as possible, taking into account the specifically provided structural configuration, in order, firstly, to achieve a stable support and, secondly, not to obstruct the further function of the inductor. Starting from the previously described rectangular shape, it is accordingly preferred if the distance between the two spacing elements is at least 50%, particularly preferably 60%, of the length of the long side.

If the conductor loop has limbs extending along the long side, the spacing elements can be arranged between the limbs The connection of such a conductor loop with two limbs customarily takes place here between the limbs or at an interruption in one of the limbs. If the connection is formed at a first end of the two limbs, the two limbs are connected to each other at the opposite, second end thereof in order to form the conductor loop. If, by contrast, the connection is formed at an interruption in one of the limbs, the limbs are connected to each other at the two ends thereof in order, starting from the connection, to form a closed loop.

The carrier serves to hold the induction coil and the spacing elements in a predetermined position. Furthermore, the carrier is advantageously also used for a flux concentration in order to improve the power coupling by means of the induction coil. The carrier can be manufactured, for example, from a soft iron and plastics compound which can be processed in a pressing and sintering process and has both ferromagnetic and dielectric properties and is therefore suitable for the concentration or shielding of high-frequency electromagnetic fields. By means of the use of iron powder in a non-conductive plastics matrix, eddy current losses can be avoided even in the event of great permeability. A flux concentration material suitable for the carrier is sold under the trade names Ferroton® and Fluxtrol®.

When the carrier is produced in a sintering process, a receiving groove for the coil and depressions for the spacing elements can be produced directly. The depressions can be formed either in the form of blind holes or in the form of continuous openings. Alternatively, however, in the case of the materials described, the advantage is also afforded that said materials can also still be processed using material-removing methods.

In order to accommodate the conductor loop, a groove which is U-shaped in cross section is preferably formed within the area of the carrier, and therefore the conductor loop, after insertion, is then surrounded laterally by flux concentration material.

The spacing elements have to be formed from a material which is thermally and mechanically sufficiently durable, for which purpose, according to a preferred refinement of the invention, ceramic is used. Ceramic is distinguished by dimensional stability, mechanical load-bearing capacity and also thermal stability.

If the spacing elements touch the surface during a relative movement between the inductor and the surface to be hardened, scratching or jamming can be avoided. For this purpose, the contact surface of the spacer elements, which contact surface is provided for contact with the surface to be hardened, has a rounded shape, in particular a spherical shape. The spacing elements can be inserted by a circular-cylindrical section into the carrier. In a corresponding manner, the depression formed in the carrier is then also circular-cylindrical, wherein such a depression can be produced in a particularly simple manner by drilling or else directly during the sintering process for producing the carrier.

With the spacing elements, during the use of the inductor, a minimum gap is maintained, avoiding direct contact between the conductor loop and the surface to be hardened.

According to a preferred refinement of the invention, the spacing elements are provided merely for an alternative support if an additional tracking of the gap fails, is deactivated or does not function correctly. During the customary progressive surface layer hardening, the distance between inductor and surface to be hardened is adjusted by the tracking of the gap, wherein a gap then also remains between the spacing elements and the surface to be hardened.

The spacing elements therefore preferably protrude only slightly in relation to the conductor loop in order, firstly, to permit free control of the gap by the corresponding control device, but, secondly, also with adequate reliability to avoid direct contact. The spacing elements preferably protrude by 0.5 to 2 mm over the conductor loop with respect to a plane formed by the first side of the carrier.

The spacing elements can be fastened to the carrier in different ways. In principle, it is conceivable to screw on the spacing elements themselves, to secure same with a screw or to brace same with a clamping mechanism. However, a permanent fastening of the spacing elements by means of adhesive bonding is particularly preferred. The advantage is afforded here that a retrospective adjustment of the spacing elements is eliminated.

Furthermore, the planar inductor with spacing elements adhesively bonded therein can be produced in a particularly simple manner In a preferred method for producing the previously described planar inductor, first of all the carrier is manufactured with a groove for the induction coil and with a depression for the spacing elements. As already explained previously, the groove and the depressions can be formed either directly during the forming of the carrier from raw material or subsequently by a material-removing method. The induction coil is then inserted into the groove and secured. In order to install the spacing elements, the latter are first of all inserted with adhesive into the associated depression and merely pre-positioned. The adhesive can be applied to the spacing elements and/or to the walls of the depression. After the spacing elements have been pre-positioned, the latter are also pressed in as far as a desired position before the adhesive cures. With the method described, the spacing elements can be mounted in a simple manner with a high degree of accuracy. The depressions here customarily have a height which is not fully used in the pressing-on operation. The pressing in takes place only as far as a desired position in which the spacing elements are at a predetermined distance from the induction coil. For the pressing-in, for example, a parallel strip for the planar inductor can be inserted, wherein the parallel strip has a substantially flat surface which has indentations merely in the region of the spacing elements. The depth of the indentations corresponds here to the excess length of the spacing elements in relation to the induction coil.

The present disclosure will be discussed in further detail below with reference to with reference to the attached drawing figures.

Figure 2:
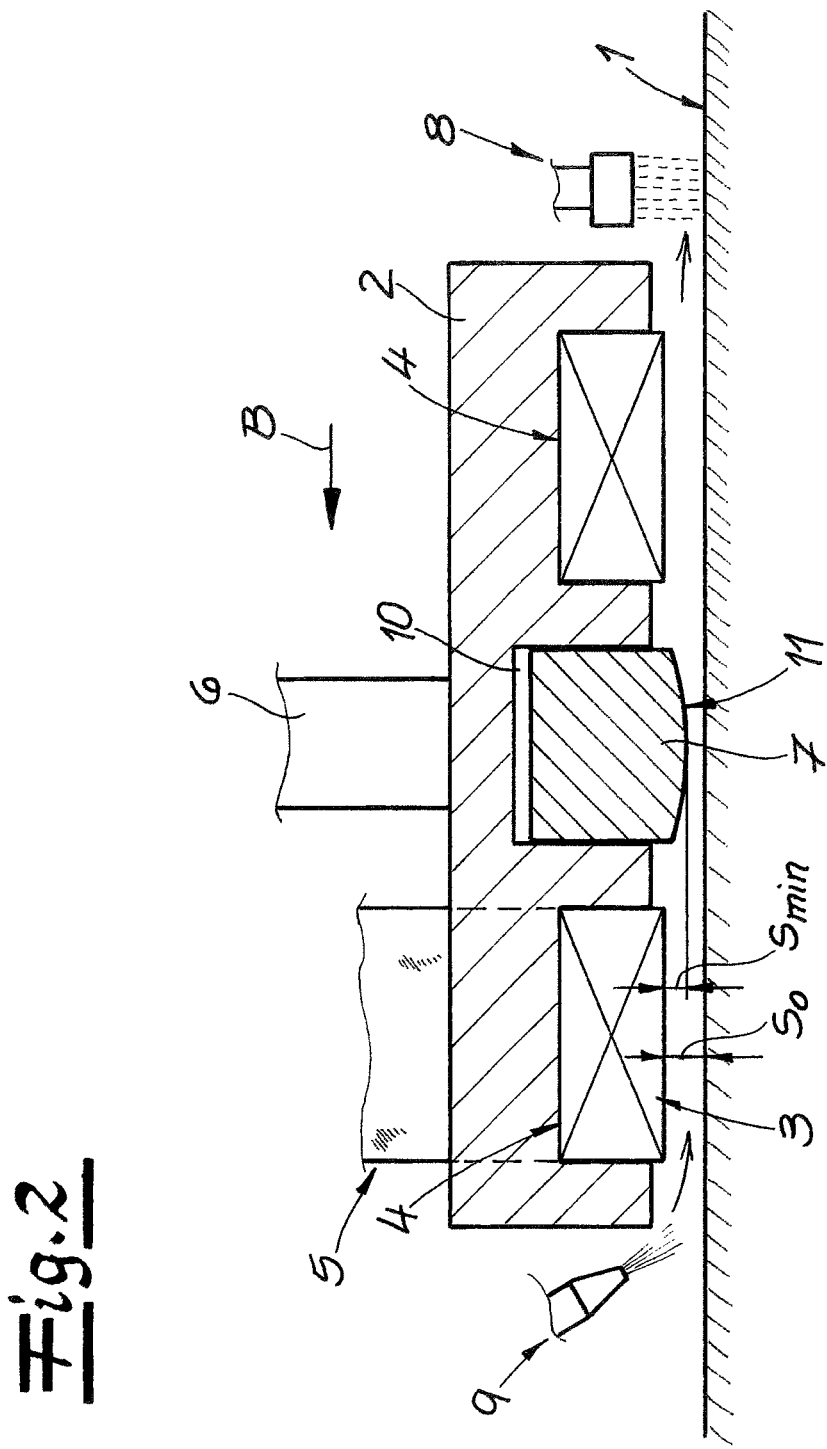
FIG. 2 is a cross section view of the inductor of FIG. 1, during a method for progressive surface layer hardening of a workpiece.

FIG. 1 shows a planar, substantially flat inductor for progressive surface layer hardening, from a first side which, during the hardening operation, is guided at a small distance over a surface 1 to be hardened (FIG. 2). The inductor has a carrier 2 consisting of a soft iron and plastics compound as flux concentration material. The soft iron is provided as powder and is connected to the plastic in a sintering process. The carrier 2 can be shaped here both during the sintering process and by means of retrospective processing, in particular material-removing processing.

It can be gathered from a comparative view of FIGS. 1 and 2 that an induction coil 3 in the form of a conductor loop is arranged in an encircling groove 4 within the first side of the carrier 2. The induction coil 3 is merely illustrated schematically. In order to achieve good cooling, the induction coil 4 can be, for example, hollow on the inside in order to permit the passage of a cooling liquid. Corresponding water-cooled induction coils 3 are known in industry.

The planar inductor customarily has a rectangular shape with a long side and a short side. The induction coil 3 in the form of a conductor loop comprises two limbs extending along the long side, wherein said limbs are connected to each other in order to form a closed loop. In the exemplary embodiment illustrated, the connection 5 is formed at an interruption in one of the limbs. Alternatively, the connection 5 can also take place at one end of the limbs, wherein the latter then, of course, are not directly connected to each other there.

According to FIG. 2, the planar flat inductor is arranged with an arm 6 on an adjustment device (not illustrated) with which a gap $S_0$ between the lower side of the induction coil 3 and the surface 1 to be hardened can be adjusted. For this purpose, the planar inductor according to the invention can also be combined with a measuring roller which is known per se.

In particular in the event of a malfunction of the adjustment device, an imprecise positional determination by means of a measuring roller or the like and when the high frequency is switched on for the progressive surface layer hardening, there is the risk that the planar inductor does not maintain a predetermined gap size $S_0$. In order in this case to avoid direct contact of the carrier 2 or of the induction coils 3 with the surface 1 to be hardened, two spacing elements 7 which are arranged at a distance from each other, are inserted into the carrier 2 and protrude from the carrier 2 on the first side and over the induction coil 3 are provided according to the invention. The spacing elements 7 have the effect that a minimum gap $S_{min}$ is always maintained between the induction coil 3 and the surface 1 to be hardened. The two spacing elements 7 can preferably be manufactured from ceramic and preferably lie far apart in order not to interfere with the further function of the planar inductor and in order to ensure a uniform support if the need arises.

FIG. 2 accordingly shows the planar inductor during the progressive surface layer hardening. The planar inductor is guided in the direction of movement B, with the surface 1 located below the induction coil 3 being heated by the latter being acted upon by alternating voltage. The hot surface 1 is subsequently quenched with cooling liquid from a sprinkler 8 in order to achieve a structural conversion in relation to the non-heated, lower regions and hardening of the metallic material of the surface layer. In order to avoid cooling liquid entering under the inductor, according to FIG. 2 blocking air 9 is blown in on the opposite side, said blocking air flowing between the surface 1 to be cured and the planar inductor in the direction of the sprinkler 8. The flow of blocking air 9 is not impaired by the spacing elements 7, which lie far apart from each other.

It can be gathered from a comparative view of FIGS. 1 and 2 that the spacing elements 7 are inserted by a circular-cylindrical section into the carrier 2. The depressions 10 accordingly have a circular-cylindrical shape which can be produced particularly easily during the sintering process for producing the carrier or subsequently by material-removing processing.

If the spacing elements 7 enter into contact with the surface 1 to be hardened during the movement of the planar inductor, abrasion can be avoided, and therefore the spacing elements 7 have an exposed contact surface 11 with a spherical shape.

In the exemplary embodiment of FIG. 2, the spacing element is secured in the associated depression 10 in such a manner that the gap size $S_{min}$ is maintained upon contact of the contact surface 11 with the surface 1 to be hardened. The spacing element 7 does not extend here as far as the base of the depression 10 which can correspondingly also be formed by a continuous bore.

Figure 3:
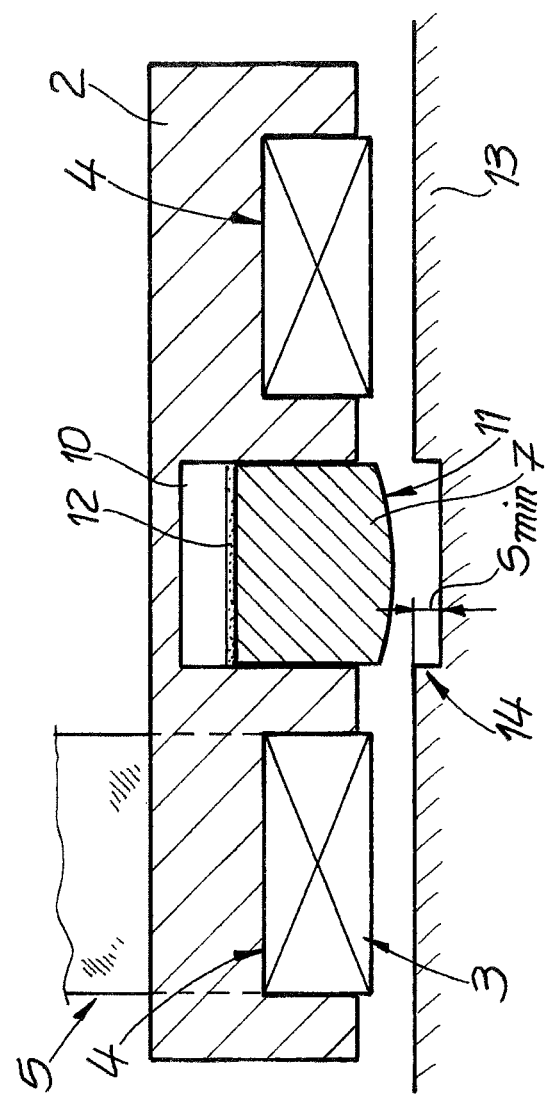
FIG. 3 is a cross section view of the inductor of FIG. 1, during the production thereof.

Against this background, FIG. 3 shows a preferred method for producing the planar inductor.

After the carrier 2 has first of all been manufactured with the groove 4 for the induction coil 3 and with the depressions 10 for the spacing elements 7, the induction coil 3 is already inserted into the associated groove 4 and secured there. For the fastening of the spacing elements 7 in the associated depressions 10, use is then made of an adhesive 12 which is introduced into the depressions 10 and/or is applied to the cylindrical section of the spacing elements 7. The spacing elements 7 are firstly roughly pre-positioned in the associated depressions, with the spacing elements 7 then being pressed in as far as a desired position before the adhesive 12 cures. For this purpose, according to FIG. 3, a parallel strip 13 which has a step 14 in the region of the spacing elements 7 can be inserted in a particularly simple manner The height of the step 14 corresponds here to the minimum gap size $S_{min}$ which, after the adhesive 12 cures, is then always maintained by the spacing elements 7 during the progressive surface layer hardening.

The invention claimed is:

1. A planar inductor for progressive surface layer hardening, the planar inductor comprising:
    a carrier;
    an induction coil that is disposed at least partially in a first side of the carrier, wherein the induction coil is exposed and is configured as a conductor loop; and
    at least two spacing elements that are arranged at a distance from each other, wherein the at least two spacing elements are coupled to the carrier and protrude beyond the carrier and beyond the conductor loop.

2. The planar inductor of claim 1, wherein the carrier is formed as flux concentration material from a soft iron and plastics compound.

3. The planar inductor of claim 1, wherein the inductor is rectangular in shape with a long side and a short side, wherein the length ratio of the long side to the short side is at least 2:1.

4. The planar inductor of claim 3, wherein the distance between the at least two spacing elements is at least 50% of the length of the long side.

5. The planar inductor of claim 3, wherein the conductor loop has limbs extending along the long side, wherein the at least two spacing elements are arranged between the limbs.

6. The planar inductor of claim 5, wherein a connection of the induction coil is formed between the limbs or at an interruption in one of the limbs.

7. The planar inductor of claim 1, wherein the at least two spacing elements are composed of ceramic.

8. The planar inductor of claim 1, wherein an exposed contact surface of the at least two spacing elements has a spherical shape.

9. The planar inductor of claim 1, wherein the at least two spacing elements are disposed in cylindrical depressions of the carrier, wherein bottoms of the at least two spacing elements are spaced apart from bottoms of the cylindrical depressions.

10. The planar inductor of claim 1, wherein the at least two spacing elements protrude by 0.5 mm to 2 mm over the induction coil with respect to a plane formed by the first side of the carrier.

11. The planar inductor of claim 1, wherein the conductor loop is inserted into a groove which is formed within the carrier and is U-shaped in cross section.

12. A planar inductor configured to be positioned parallel to a surface to be hardened of a metallic workpiece, for progressive surface layer hardening the surface to be hardened, the planar inductor comprising:
- a carrier;
- an induction coil disposed on a first side of the carrier and residing in a first plane, the carrier and induction coil being configured to be positioned such that,
  - the first plane in which the induction coil resides is parallel to the surface to be hardened, and
  - the induction coil is spaced apart from the surface to be hardened in an unobstructed fashion; and
- a plurality of spacing elements that protrude from the carrier and are configured to prevent contact between the induction coil and the surface to be hardened.

13. The planar inductor of claim 12 wherein the first side of the carrier comprises a groove in which the induction coil is disposed so as to be flush with the first side of the carrier.

14. The planar inductor of claim 12 wherein the spacing elements are comprised of different material than the carrier, wherein the carrier comprises depressions in which the spacing elements are disposed, with the depressions being configured as blind holes or continuous openings.

15. The planar inductor of claim 14 wherein the spacing elements are secured in the depressions of the carrier with adhesive.

16. The planar inductor of claim 12 further comprising a control device configured to maintain a gap between the inductor coil and the surface to be hardened, with the gap being greater than a distance beyond the inductor coil that the spacing elements protrude, wherein the spacing elements serve as a backup to the control device in case the control device fails, deactivates, or malfunctions.

17. The planar inductor of claim 12 further comprising a sprinkler configured to quench the surface with cooling liquid.

18. The planar inductor of claim 12 further comprising an adjustment device that is coupled via an arm to the carrier, the adjustment device configured to adjust an amount of space between the induction coil and the surface to be hardened.

19. The planar inductor of claim 12 wherein the spacing elements are disposed at opposite ends of the carrier.

* * * * *